United States Patent [19]

Hopper et al.

[11] Patent Number: 5,106,590
[45] Date of Patent: Apr. 21, 1992

[54] GAS MIXER AND DISTRIBUTOR WITH HEAT EXCHANGE BETWEEN INCOMING GASES

[75] Inventors: Alec Hopper, Maidenhead; Graham Hill, London; Michael Dunster, Gerrards Cross, all of England

[73] Assignee: Davy McKee (London) Limited, London, England

[21] Appl. No.: 522,614

[22] Filed: May 11, 1990

[51] Int. Cl.⁵ .................. B01J 8/00; B01J 8/02
[52] U.S. Cl. .................. 422/198; 48/127.9; 48/180.1; 48/198.8; 422/220; 422/310
[58] Field of Search ........... 422/208, 198, 191, 220, 422/310; 48/127.9, 107, 95, 180.1, 198.6, 198.7, 198.8

[56] References Cited

U.S. PATENT DOCUMENTS

| | | |
|---|---|---|
| 800,777 | 10/1905 | Westmacott . |
| 1,233,942 | 7/1917 | Wiggins . |
| 1,348,455 | 8/1920 | Spicer et al. . |
| 2,029,604 | 2/1936 | Bayer et al. . |
| 2,039,603 | 5/1936 | Maier ............... 48/198.7 |
| 2,288,951 | 7/1942 | Jones et al. . |
| 2,765,358 | 10/1956 | Pichler et al. . |
| 3,019,271 | 1/1962 | Braconier et al. . |
| 3,081,818 | 3/1963 | Braconier et al. ......... 48/180.1 |
| 3,409,407 | 11/1968 | Loeffler et al. . |
| 3,477,824 | 11/1969 | Reed .................. 422/220 |
| 3,583,476 | 6/1971 | Woebcke et al. . |
| 3,839,548 | 10/1974 | Jackson . |
| 3,870,232 | 3/1975 | Lacchia . |
| 3,871,838 | 3/1975 | Henkel et al. ........... 48/180.1 |
| 4,087,259 | 5/1978 | Fujitani et al. ........... 48/212 |
| 4,381,187 | 4/1983 | Sederquist ............. 48/212 |
| 4,525,138 | 6/1985 | Snyder et al. . |
| 4,796,814 | 1/1989 | Klemm et al. . |
| 4,819,878 | 4/1989 | Bailey et al. . |
| 4,865,820 | 9/1989 | Dunster et al. . |

*Primary Examiner*—Peter Kratz
*Attorney, Agent, or Firm*—Rothwell, Figg, Ernst & Kurz

[57] ABSTRACT

A gas mixer and distributor has an array of parallel gas mixing and distributing tubes which extend from a first chamber through successive second and third chambers. Respective coaxial tubular sections surround the tubes and communicate between the second and third chambers. Openings in the walls of the tubes communicate from the third chamber into the tubes. The first gas is fed into the first chamber for distribution into the first ends of the tube. The second gas is fed into the second chamber and passes through the annular passages formed by tubular sections over the tubes into the third chamber. The annular passages provide indirect heat exchange between the first and second gases to produce uniform temperature and density of the second gas in the third chamber before passing into the tubes through the tube wall openings.

5 Claims, 6 Drawing Sheets

GAS MIXER AND DISTRIBUTOR WITH HEAT EXCHANGE BETWEEN INCOMING GASES

BACKGROUND OF THE INVENTION

1. Field of the Invention

The present invention relates to apparatus for mixing two or more gas streams and distributing the gas mixture to the input of a reactor, for example, mixing a gaseous hydrocarbon feedstock with oxygen or an oxygen-containing gas and feeding the mixture to a catalytic reactor for partial oxidation of the feedstock.

2. Description of the Prior Art

Substantially complete mixing of gaseous reactants is highly desirable in a number of reactions, such as in partial catalytic oxidation. Uniform distribution of the mixed gases across the entrance of the reactor also provides for efficiency in the utilization of the reactor and uniformity in product. In U.S. Pat. application Ser. No. 07/085,159, filed Aug. 14, 1987, now U.S. Pat. No. 4,865,820, there is disclosed a gas mixer and distributor having an array of parallel tubes which receive first and second gases for mixing and distribution to the entrance of a catalytic reactor. A first chamber is connected to first ends of the tubes for distributing the first gas to the tubes. The tubes pass through a second chamber which distributes the second gas through openings in the walls of the tubes. The second ends of the tubes are gradually enlarged to distribute the gas mixture over the catalytic reactor entrance while preventing formation of vortices.

The above gas mixer and distributor of U.S. Pat. No. 4,865,820 has been found to enable the economical production of synthesis gas by catalytic partial oxidation of gaseous hydrocarbons in the absence of significant steam reforming reactions. However when gases of substantially different temperatures are fed to a mixer and distributor with a large number of tubes, the ratio of the gases in the mixture varies across the cross section of the reactor entrance. This reduces the efficiency of the reactor.

SUMMARY OF THE INVENTION

The invention is summarized in a gas mixer and distributor having an array of parallel gas mixing and distributing tubes extending from a first chamber through successive second and third chambers and receiving first and second gas streams through openings from the first and third chambers wherein respective coaxial tubular sections surrounding the tubes communicate from the second chamber to the third chamber. The first gas is fed into the first chamber for distribution into first ends of the tube. The second gas is fed into the second chamber and pass through the annular passages formed by the tubular sections over the tubes producing uniform indirect heat exchange between the first and second gases to provide cross-sectional uniformity in temperature and density changes of the gases being mixed.

An object of the invention is to construct a gas mixer and distributor having substantially uniform homogeneous distribution of gases across the entrance of a reactor.

Another object of the invention is to reduce nonuniformity of gas density in a distribution chamber caused by temperature changes from tubes carrying another gas at a substantially different temperature through the distribution chamber.

One advantage of the invention is that a gas which is to be mixed with another gas being carried by a distributed array of parallel tubes is passed through annular paths in close contact with the tubes to provide uniform heat exchange between the gases.

Another advantage of the invention is that tubular sections coaxially surround mixing tubes in an array and shield the gases being distributed to the tubes from indirect heat exchange during distribution of one of the gases from the edges to the center of the array.

Other objects, advantages and features of the invention will be apparent from the following description of the preferred embodiment taken in conjunction with the accompanying drawings wherein:

DESCRIPTION OF THE PREFERRED EMBODIMENT

Figure 1:
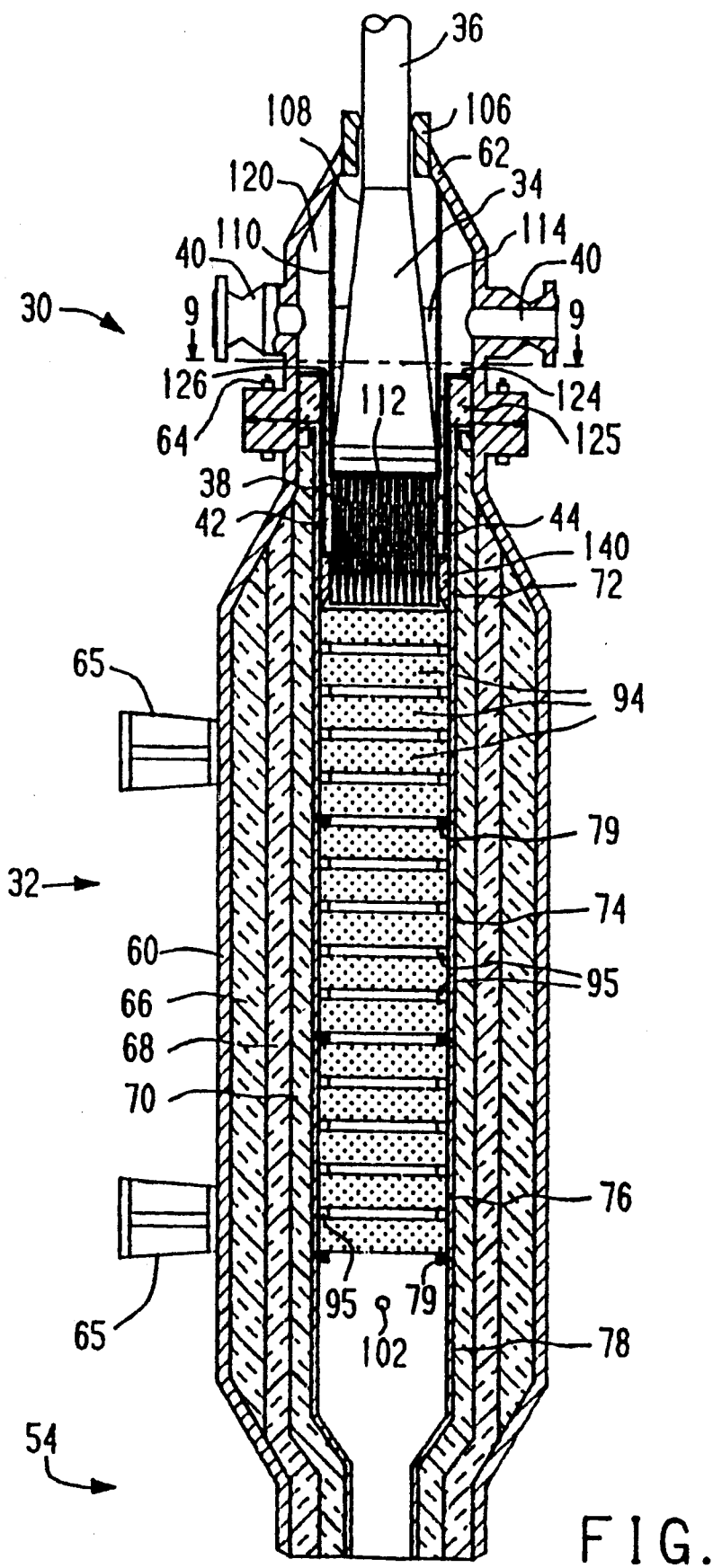
FIG. 1 is a sectional view of a reactor including a gas mixer and distributor in accordance with the invention.

As shown in FIG. 1, a reactor includes an input mixing and distributor section, indicated generally at 30, at the entrance of a catalytic reactor section or zone, indicated generally at 32. The mixer and distributor 30 includes a first chamber 34 which receives a first gaseous reactant through inlet 36, a second chamber 38, FIG. 2, which receives a second gaseous reactant through inlets 40, and a third chamber 42 which receives the second gaseous reactant from the second chamber. The first chamber 34 communicates with one ends of an array of a plurality of parallel tubes 44 which pass successively through the second and third chambers 38 and 42. Tubular sections 46 extend coaxially over the respective tubes 44 in the chamber 38 and form annular passageways 48 for passing the second gas from the second chamber in close contact with the exterior surface of the tubes 44 into the third chamber 42. The tubular sections 46 and the annular passageways 48 provide uniformity in changes of temperature by indirect heat exchange through the walls of the tubes to produce uniform gas density throughout the third chamber 42. Openings 50 are formed through the walls of the tubes 44 in the chamber 42 for passing the second gas from the chamber 42 into the lumens of the tubes where the first and second gases are thoroughly mixed. Exit sections 52 of the tubes have gradually increasing diameters to uniformly distribute the mixed gases across the entrance of the reactor section 32.

An example of a particular reactor utilizing the mixer and distributor 30 is a reactor for partially oxidizing a gaseous hydrocarbon feedstock wherein the feedstock is partially oxidized or reformed to produce a product which is then passed through the exit section indicated generally at 54. The feedstock may be a hydrocarbon gas, such as natural gas, or a vaporized hydrocarbon liquid, such as naphtha, which is to undergo conversion. The oxidant is an oxygen-rich gas stream which may be substantially pure oxygen, air or oxygen enriched air. Steam may be included in the hydrocarbon feedstock and/or the gaseous oxidant stream. The mixer and distributor is suitable for use in a reactor performing the process as described in copending U.S. Pat. application No. 332,369 filed on Mar. 31, 1989, as a continuation of U.S. Pat. application No. 085,160 filed on Aug. 14, 1987, both now abandoned, for Production of Synthesis Gas From Hydrocarbonaceous Feedstock. In this process the thorough mixing of the gaseous hydrocarbon with oxygen to form a homogeneous mixture of hydrocarbon and oxygen molecules prior to partial oxidation in a catalyst reaction zone is found to efficiently produce synthesis gas without any significant steam reforming reaction.

The mixer and distributor 30 can be employed in many types of reactors, in addition to the disclosed example of a catalytic partial oxidation reactor for a raw hydrocarbon stream, which benefit from uniformity and thorough mixing of two or more gaseous reactants being fed to a reaction chamber. It is particularly suitable for exothermic reactions where it is desired to perform the reaction in a controlled manner within a catalyst. Examples of other reactors include those employed in autothermal steam reforming or secondary reforming to produce products such as synthesis gas, ammonia, methanol, etc.

Figure 8:
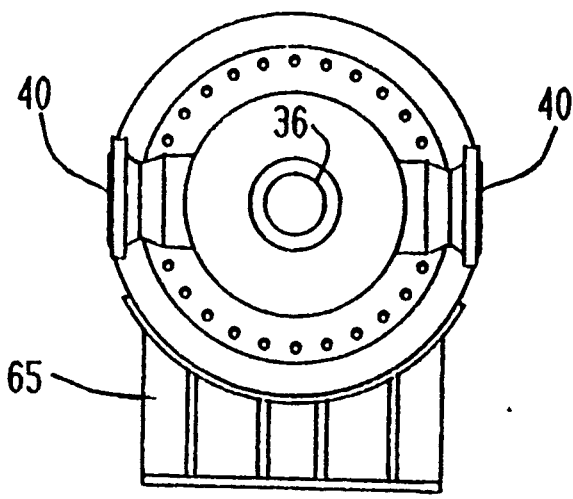
FIG. 8 is an top view of the reactor of FIG. 1.

The reactor includes an outer shell 60 of structural metal with a top 62 secured thereon by bolts 64. Mounting brackets 65, FIGS. 1 and 8, are secured to the shell 60 for suitably mounting the reactor. On the inside of the shell 60 in the reactor section 32 and outlet section 54, there are secured layers 66, 68 and 70 of insulation.

Figure 10:
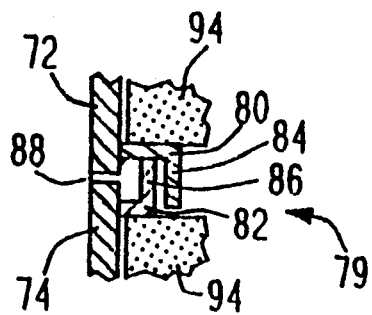
FIG. 10 is a sectional view of a shroud seal and catalyst spacing structure broken away from the reactor of FIG. 1.

A metal shroud formed by entrance segment 72, catalyst segments 74 and 76 and exit segment 78 covers the interior surface of the inner insulation layer 70 to prevent the gaseous reactants or product from infiltrating the insulation. Expansion joints between the shroud segments 72, 74, 76 and 78 are formed by labyrinth glands 79 which, as shown in FIG. 10 for the labyrinth gland between shroud segments 72 and 74, include angle member rings 80 and 82 with at least one of the rings attached to its respective segments 72 or 74. The rings 80 and 82 have respective flanges 84 and 86 which intermesh to seal the joint while allowing expansion and contraction at gap 88 between the segments 72 and 74.

Figure 11:
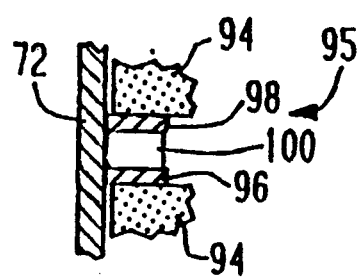
FIG. 11 is a sectional view of a catalyst spacing ring broken away from the reactor of FIG. 1.

The reactor section 32 has a stack of monolithic catalyst discs 94 which are supported in spaced relationship within the shroud segments 72, 74 and 76. The labyrinth glands 79 hold the catalyst discs 94 in spaced relationship at the joints between the segments 72, 74 and 76 while annular spacers 95 formed by plate rings 96 and 98, FIG. 11, with six equally spaced circumferential spacers 100 hold the discs 94 in spaced relationship within each shroud segment. The catalyst material is selected in accordance with the reaction being performed. For partial oxidation reactions, platinum-palladium catalyst materials, rhodium catalyst materials, other high surface area catalyst materials such as alumina, or catalyst materials employed in catalytic converters of automobile exhaust systems are suitable. The catalyst material can be supported on a porous or honeycomb-type support. Disclosures of suitable catalyst materials is found in the above mentioned U.S. Pat. application Ser. No. 332,369, U.S. Pat. No. 4,522,894, and published European Patent Application No. 0,112,613.

A temperature probe 102 is mounted below the bottom refractory disc 94 for measuring temperature. Additional temperature probes (not shown) can be mounted in various locations in the insulation and on other parts of the reactor in order to monitor temperatures.

The outlet section 54 is suitably formed for being connected to a downstream heat recovery boiler (not shown) and/or other processing equipment.

Figure 9:
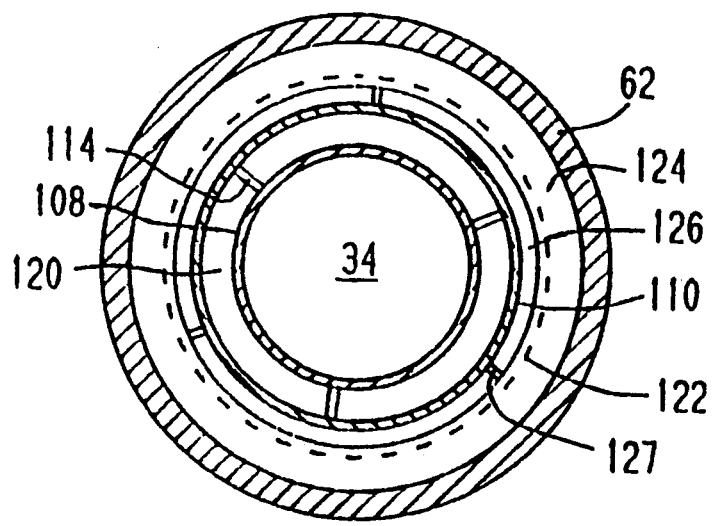
FIG. 9 is a sectional view taken at line 9—9 in FIG. 1.

In the section 30, the inlet tube 36 extends through a thermal sleeve 106 in the center of the cap 62 and communicates to the small end of an expanding feed cone 108 which has its large end removably fitted and sealed in a first sleeve 110 of a mixer and distributor tube assembly. The sleeve 110 is mounted at one end on the outer edge of a circular plate 112 of the assembly and extends over the cone 108 with its other end sealingly engaging the cap 62. Three circumferentially spaced spacer plates 114, see FIG. 9, attached to the outside surface of the cone 108 aid in positioning of the cone within the sleeve 110. The cone 108, the portion of the sleeve 110 exposed to the interior of the cone, and the plate 112 form the first chamber 34. First ends 116 of the tubes 44 are mounted in bores formed transversely through the plate 112 to receive equal flows of gas from the chamber 34. The space between the cone 108 and the sleeve 110 shields the cone 108 from the sleeve to reduce indirect heat transfer producing differential temperatures and densities between outer and central portions of the gas in the chamber 34.

Figure 2:
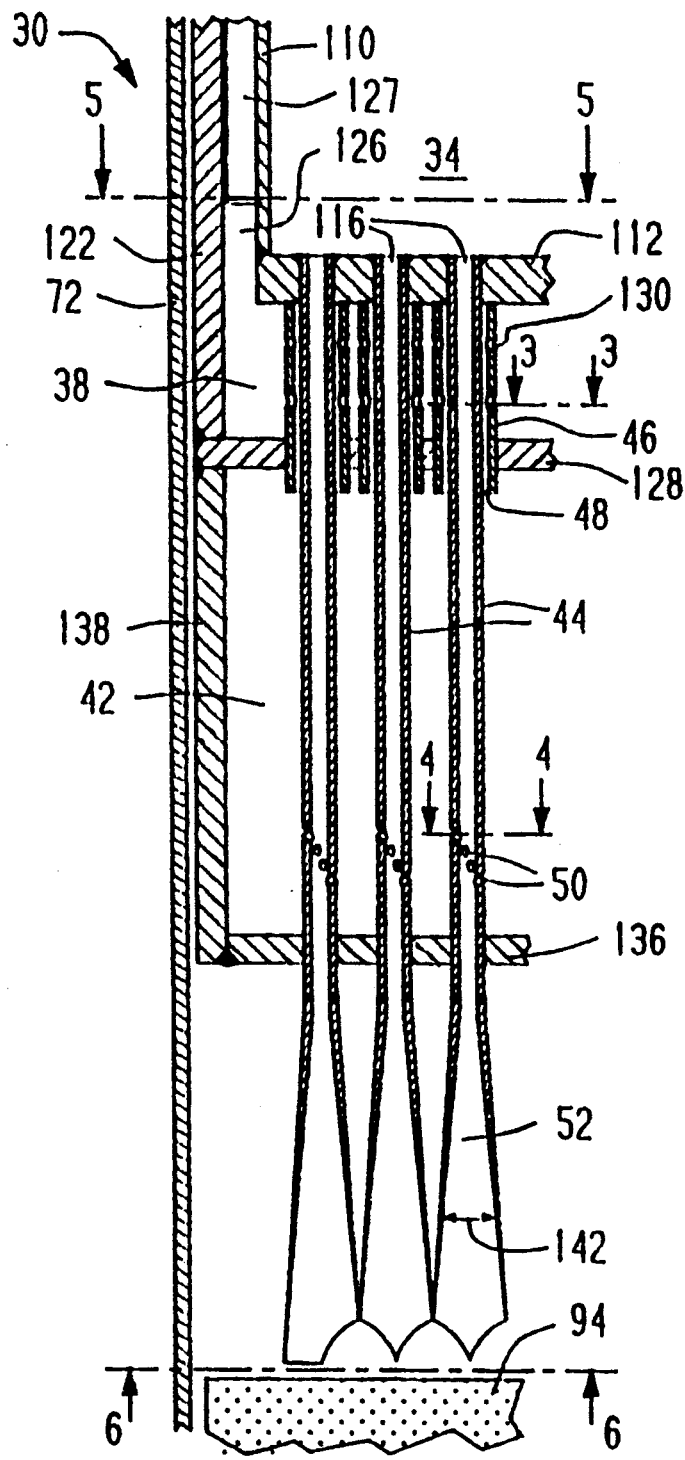
FIG. 2 is an enlarged sectional view of a broken away portion of the gas mixer and distributor of FIG. 1.
Figure 3:
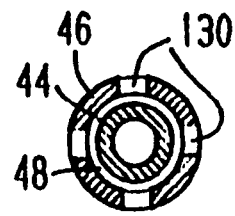
FIG. 3 is a sectional view taken along line 3—3 of FIG. 2.
Figure 4:
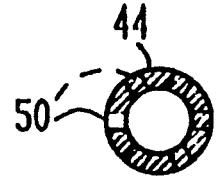
FIG. 4 is a sectional view taken along line 4—4 of FIG. 2.
Figure 5:
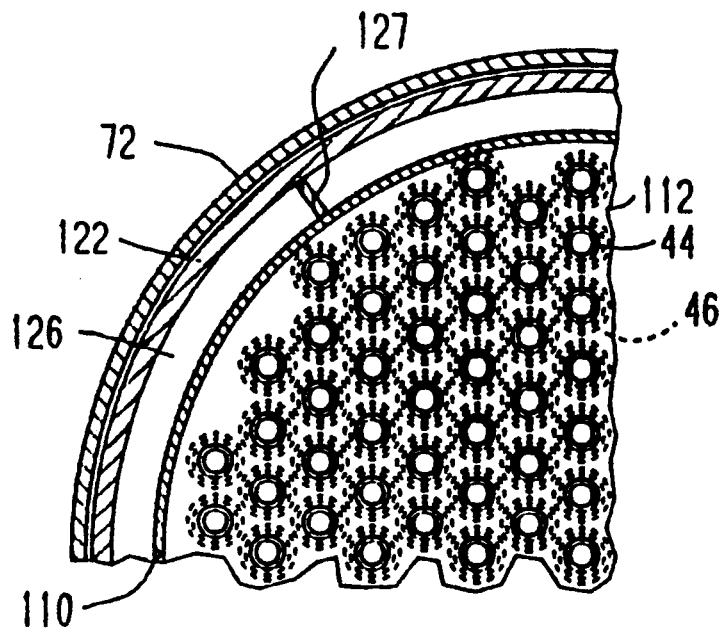
FIG. 5 is a sectional view taken along line 5—5 of FIG. 2.

The second inlets 40, formed by side ports of the cap 62, open into an annular space 120 within the cap 62 around the sleeve 110. An outer sleeve 122 of the mixer and distributor tube assembly extends over a portion of the sleeve 110 and has a flange 124 sealingly engaging the cap 62 to form one wall of the annular space 120. The space between the flange 124 and the upper edge of flange of the shroud section 72 is filled with a suitable insulation 125. An annular passage 126, FIGS. 1, 2, 5 and 9, between the sleeves 110 and 122 communicates from the space 120 to the second chamber 38. Three circumferentially spaced spacing members 127, see FIGS. 2 and 9, maintain the annular passage during formation of the mixing and distribution assembly. The chamber 38 is interposed between the first chamber 34 and the third chamber 42 and is formed on one side by the plate 112, on the periphery by the sleeve 122, and on the other side by a circular plate 128 which is parallel to the plate 112 and perpendicular to the tubes 44. The sleeve 122 is mounted on the periphery of the plate 128. The tubular members 46 are secured to the plates 112 and 128 and extend from the plate 112 through openings in the plate 128. Gas entering the periphery of the chamber 38 and passing to the center of the chamber 38 is shielded from exposure to the tubes 44 by the tubular members 46 covering the tubes 44 in the chamber 38 to reduce temperature and density differentials between outer and center regions of the second chamber 38. The chamber 38 serves as a plenum to distribute the second gas to openings 130 in the tubular members 46. These openings 130, see FIG. 3, are sized to produce equal mass flows through the annular passages 48 between tubular members 46 and tubes 44 from the chamber 38 into the chamber 42. The annular passages 48 expose the gas flows through the annular passages 48 and the tubes 44 to substantially uniform indirect heat exchange through walls of the tubes 44.

The chamber 42 is formed on one side by the plate 128, on the other side by a plate 136, and on the periphery by a sleeve 138 which is mounted at its respective ends on the plates 128 and 136. Temperature and density changes in the gases prior to passing of the gas from the chamber 42 through the openings 50 of the tubes 44 are uniform throughout the cross section of the chamber 42 to prevent different ratios of gases being mixed in outer and inner tubes of the array of tubes 44. The openings 50 are formed at an obtuse angle with the wall of the tubes 44 so as to inject the gas from the chamber 42 into the tubes at an acute angle relative to the direction of flow of the gas in the tubes, preferably at an angle from 15° to 60°, for example 30°, relative to the gas flow in the tubes. This tends to prevent gas eddies or vortices in the tubes which could result in undesired reaction or combustion of incompletely mixed gases outside of the catalyst.

Figure 6:
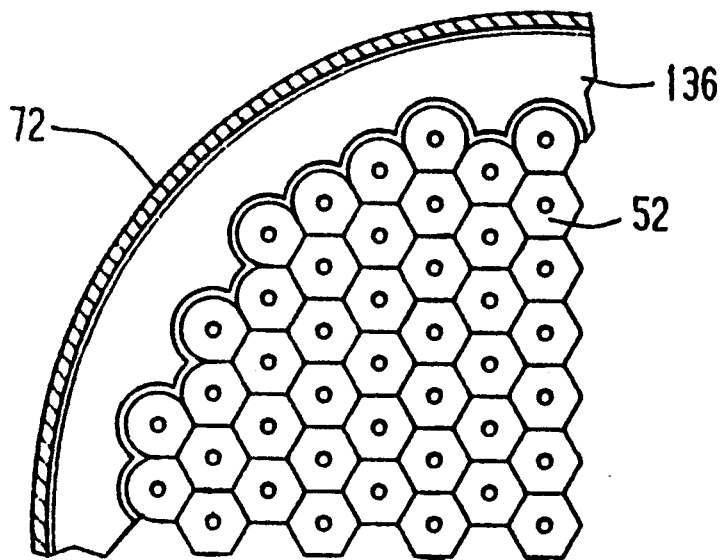
FIG. 6 is a sectional view taken along line 6—6 of FIG. 2.

The tubes 44 pass through openings in the plate 136. These openings are sealingly fitted on the tubes. The gradually flared exit sections 52 of the tubes are shown as being formed separately and then attached at their small ends to the upper tube sections which have uniform diameters throughout the length of the upper sections. The larger ends of the tube exit sections 52, FIGS. 2 and 6, are machined or otherwise formed so as to eliminate any transverse surfaces which could result in eddies or vortices in the gas mixture. Alternatively, the sections 52 could be formed with a cross section progressing from circular at the small end to hexagonal at the large end. An annular sealing ring 140, FIG. 1, of suitable refractory material surrounds the lower section of the array of tubes to prevent vortices forming around the outer edge of the array of flared tube section. Vortices result in undesirable combustion or reaction outside of the catalyst bed. In the catalytic partial oxidation reactor, the catalyst controls the partial oxidation reaction to promote uniform partial oxidation of the substantially completely mixed gases without any carbon formation whereas partial oxidation outside of the catalyst produces carbon.

The number of tubes 44, the internal diameter of the tubes, and the size and number of the openings 50 in each tube are selected relative to the gas input velocities and pressures through inlets 36 and 40 so as to produce turbulent flow within the tubes 44 at a velocity exceeding the flashback velocity of the mixture. The minimum distance of the openings 50 from the bottom end of the tubes 44 is selected to be equal to or greater than that required for providing substantially complete mixing of the gas streams prior to entering the catalyst reaction section. For efficient catalytic partial oxidation, substantially complete mixing means that a substantially homogenous mixture of molecules of the gases is formed.

The minimum gas velocity within the tubes 44 is selected in accordance with the type, temperature and density of the gas being reacted. For a mixture of natural gas and air with substantially no hydrogen content at ambient temperature and pressure, a minimum velocity of 3 ft./sec (1 meter/sec) is suitable, but for higher inlet temperatures or pressures or a higher hydrogen content, the minimum velocity must be increased. Typical minimum velocities for mixtures of hydrocarbon gas and air at an inlet pressure of 400 psig (2750 KPa) and inlet temperatures of 500° C. in partial oxidation reactions are from 20 to 180 ft/sec (6 to 55 m/sec) or above.

The diverging passageways in the exit tube sections 52 are formed in a manner to provide for reduction of the velocity of the gas and to produce uniform gas distribution over the inlet of the catalyst. The sides of the passageways in the sections 52 in a longitudinal plane cross-section, may be either straight or curved. The rate of increase of the transverse cross-sectional area of the passageway through sections 52 as it proceeds downstream, i.e., the angle 142 in FIG. 2, must generally be equal to or less than about 30° and preferably equal to or less than 15°, for example 10°, in order to minimize or avoid creating vortices within the sections 52.

Figure 7:
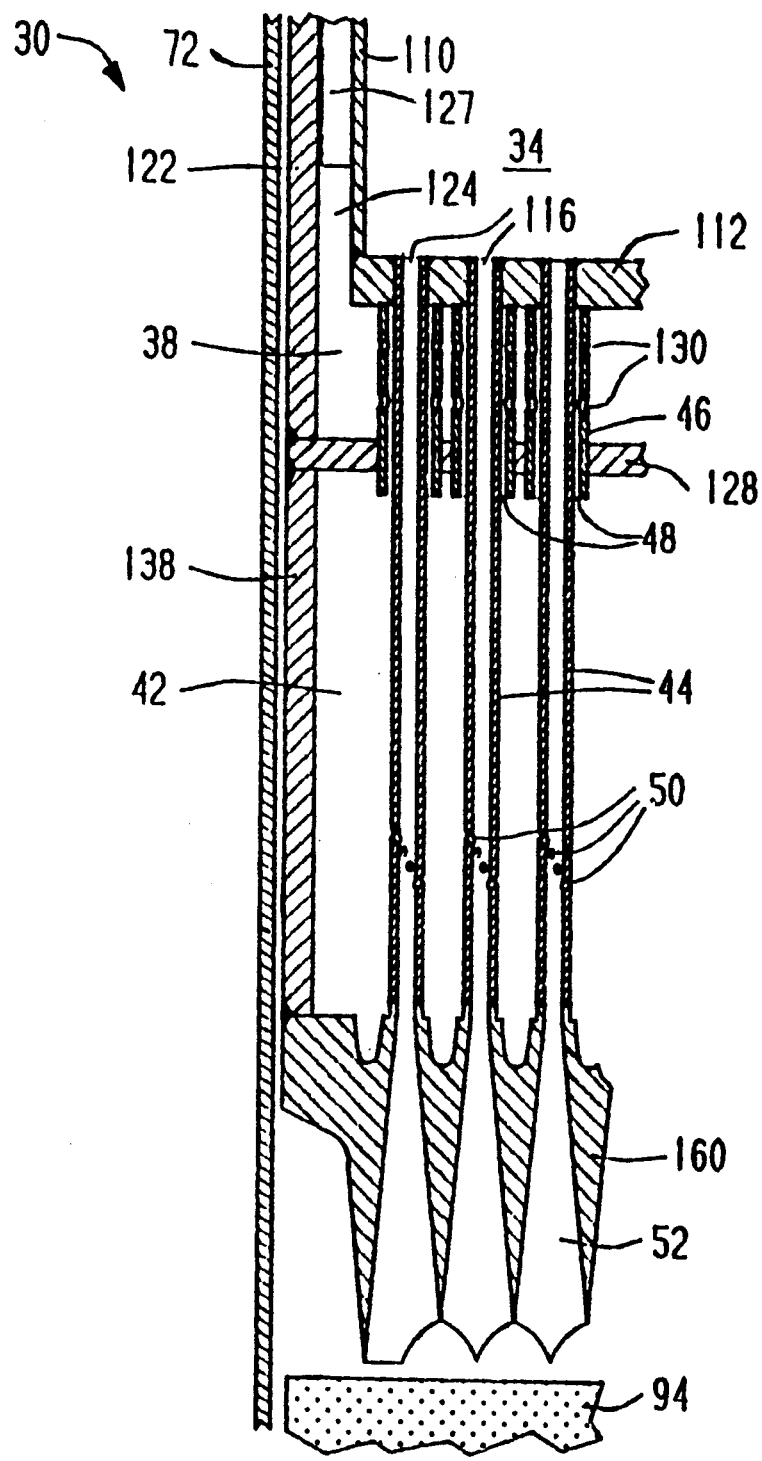
FIG. 7 is a view similar to FIG. 2 but of a variation of the gas mixer and distributor in accordance with the invention.

FIG. 7 illustrates a modification of the distributing and mixing tube assembly wherein the plate 136 and exit tube sections of FIG. 2 are replaced by an integral molded and/or machined member 160. The member 160 forms the bottom wall of chamber 42. The gradually increasing diameter sections 52 of the tubes 44 are formed in the member 160.

Figure 12:
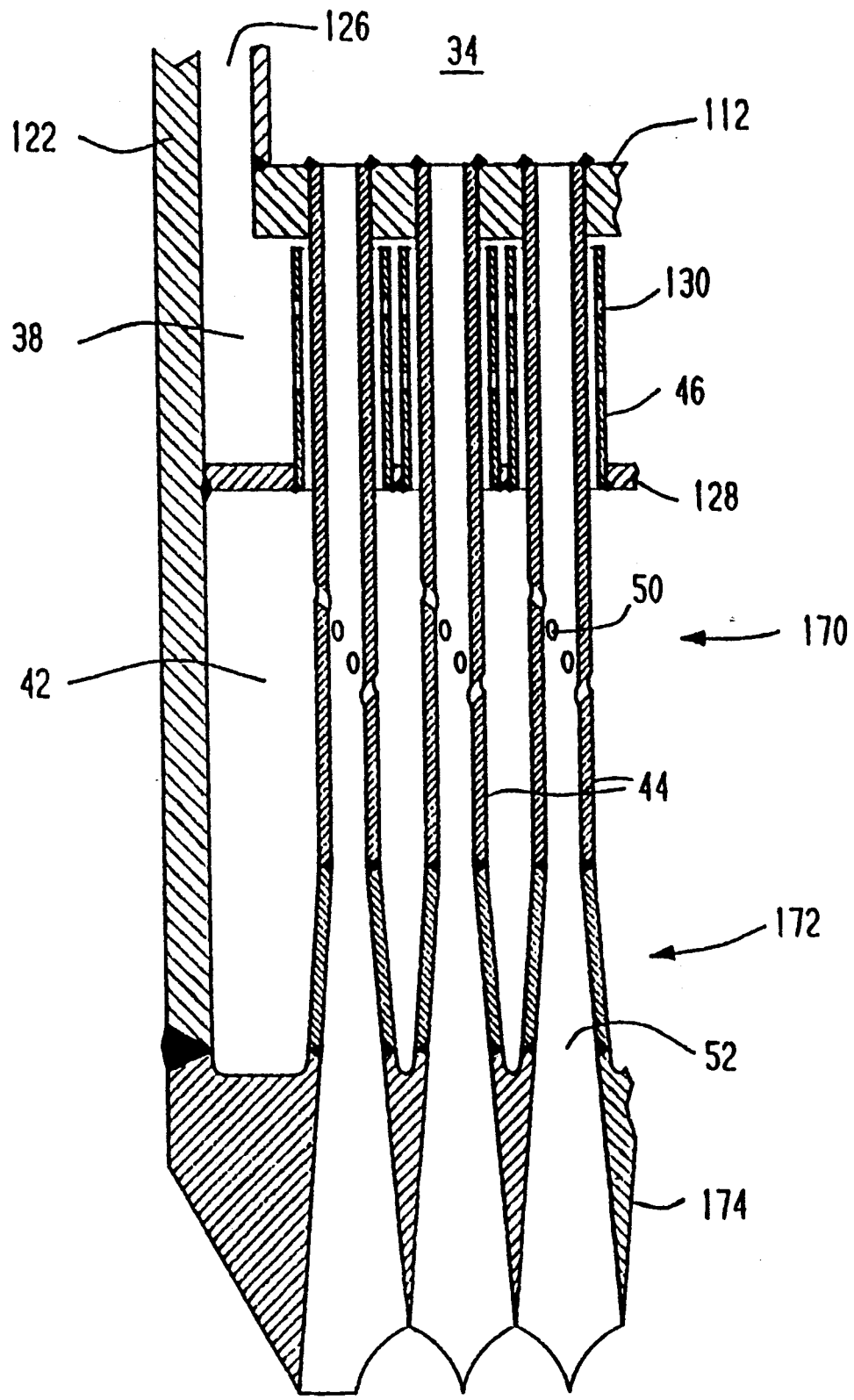
FIG. 12 is a view similar to FIG. 2 but of another variation of the gas mixer and distributor in accordance with the invention.

FIG. 12 shows a further modification wherein the tube array is formed in three sections, the upper section 170 of tubes with uniform diameter throughout their length, the middle section 172 of tubular members of gradually increasing diameter, and the lower section 174 of the molded member which completes the gradually flared opening 52 of the tubes. The sleeve 122 in the variation of FIG. 12 forms the outer wall of both chambers 38 and 42 with both the plate 128 and the member 174 being mounted on the sleeve 122. The tubular sections 46 of FIG. 12 are spaced from the plate 112 to form openings at ends of the sections 46 for receiving gas flow from the chamber 38.

In a specific example of a mixer and distributor as shown in FIGS. 1-6 and 8-11, 151 tubes 44 having an outside diameter of 20 mm and an inside diameter of 11.27 mm are welded at ends 116 in a tube plate 112 which has a diameter of 560 mm. The tubes 44 are spaced 45.54 mm center to center. Upper portions of uniform diameter have a length of about 380 mm while the exit sections 54 of gradually increasing internal diameter have a length of about 205 mm with the angle 142 being about 10°. Six openings 50 of 3.9 mm diameter are formed in each tube with the openings equally spaced around the tube and spaced about 10 mm apart along the length of the tube in a section of the tube running from about 50 to 100 mm above the beginning of the flared sections 54. The tubular sections 46 have an outside diameter of 30 mm and an inside diameter of 24 mm. Holes 130 of 4.5 mm diameter are formed in two rows of four each equally spaced circumferentially around the tubular section 46; each tubular section 46 has a total of eight holes 130. Parts exposed to the input gases at lower temperatures including the tube 36, the tubes 46, the cap 62, the cone 108, the sleeve 110, the sleeve 122 and the plate 128 are formed from a suitable corrosion resistant metal such as stainless steel type 304. Parts exposed to high temperatures including the tubes 44, the exit sections 54, the shroud sections 72, 74, 76 and 78, the plates 112 and 136 and the sleeve 138 are formed from a refractory material or a high temperature alloy such as an alloy containing a balance of nickel with 22% chromium, 14% tungsten, 2% molybdenum, 3% iron, 5% cobalt, 0.5% manganese, 0.4% silicon, 0.3% aluminum, 0.1% carbon, 0.02% lanthanum and 0.005% boron; or an alloy containing a balance of nickel with 16% chromium, 3% iron, and 4.5% aluminum. The shell 60 is formed a steel or iron, such as iron with 1¼% chromium and ½% molybdenum. The outer layer 66 of insulation is a castable or equivalent insulation such as low iron high purity 2000° F. (1090° C.) ceramic insulation. The middle layer 68 is also a castable or equivalent layer of insulation but containing 60% alumina for withstanding 3000° F. (1650° C.). The inner layer 70 is a refractory or equivalent layer such as at least 97% alumina with ceramic anchors or at least 99% alumina brick for withstanding the interior environment of the reactor section.

Since many modifications, variations and changes in detail may be made in the above described embodiments without departing from the scope and spirit of the invention as defined in the following claims, it is intended that the above description and accompanying drawings be interpreted as illustrative and not limiting.

What is claimed is:

1. A gas mixer and distributor for mixing and feeding a gaseous reaction mixture to the inlet of a reactor, the gas mixer and distributor comprising:

means forming a first chamber with a first inlet for receiving a first gaseous reactant;

means forming a second chamber downstream of said first chamber with respect to the direction of flow of said first gaseous reactant with a second inlet for receiving a second gaseous reactant;

means forming a third chamber downstream of said second chamber with respect to the direction of flow of said first and second gaseous reactants and positioned to discharge the effluent therefrom into the inlet of said reactor;

said second chamber being interposed between the first and third chambers;

an array of a plurality of parallel elongated tubes communicating at first ends thereof with the first chamber, and extending from the first chamber through the second and third chambers to the inlet of said reactor;

heat exchange means in said second chamber comprising a plurality of tubular sections coaxially positioned over the tubes to form annular flow passages around the plurality of tubes between said first and second chambers for receiving and directing flow of said second gaseous reactant through said annular passages in heat transfer interaction with said first gaseous reactant; and a plurality of openings in the walls of the tubes and communicating with the third chamber for passing streams of the second gaseous reactant into the tubes for mixing with the first gaseous reactant, whereby said gaseous reactants are mixed in said third chamber after heat transfer interaction therebetween in said second chamber;

each of said tubes including a section of gradually increasing cross-section opening toward the second ends of the tubes at the entrance of said reaction chamber to distribute the flow of the mixture uniformaly across the entrance of said reaction chamber;

said openings being spaced from the second ends of the tubes to insure substantially complete mixing of the first and second gaseous reactants within the tubes prior to entering the said reaction chamber.

2. A gas mixer and distributor as claimed in claim 1 wherein the means forming the first chamber comprises a feed cone and a first plate extending transverse to the axis of the feed cone, said first plate having a plurality of holes in which the first ends of the tubes are mounted;

the means forming the second chamber comprises the first plate, a second plate parallel to the first plate and having a plurality of holes in which the tubular sections are mounted, and sleeve means surrounding the array of tubes; and the means forming the third chamber comprises the second plate, the sleeve means, and end means secured to an end of the sleeve means.

3. A gas mixer and distributor as claimed in claim 2 wherein the end means is an integral member including passageways forming the gradually increasing sections of the tube array.

4. A gas mixer and distributor as claimed in claim 1 wherein the tubular sections each include a plurality of circumferentially spaced openings in the wall of the tubular sections communicating from the second chamber into the annular passages.

5. A gas mixer and distributor as claimed in claim 3 wherein the means forming the second chamber include a first plate having holes in which the tubes are mounted, and a second plate in which the tubular sections are mounted; and wherein the tubular sections are spaced from the first plate to define openings communicating from the second chamber into the annular passages.

* * * * *